(12) United States Patent
Takeuchi et al.

(10) Patent No.: US 10,159,943 B2
(45) Date of Patent: Dec. 25, 2018

(54) CARBON MEMBRANE FOR FLUID SEPARATION, FLUID SEPARATION MEMBRANE MODULE, AND METHOD FOR PRODUCING CARBON MEMBRANE FOR FLUID SEPARATION

(71) Applicant: TORAY INDUSTRIES, INC., Tokyo (JP)

(72) Inventors: Kosaku Takeuchi, Otsu (JP); Kentaro Tanaka, Otsu (JP); Takaaki Mihara, Otsu (JP); Tomoyuki Horiguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 82 days.

(21) Appl. No.: 15/328,363

(22) PCT Filed: Jul. 24, 2015

(86) PCT No.: PCT/JP2015/071169
§ 371 (c)(1),
(2) Date: Jan. 23, 2017

(87) PCT Pub. No.: WO2016/013676
PCT Pub. Date: Jan. 28, 2016

(65) Prior Publication Data
US 2017/0216779 A1 Aug. 3, 2017

(30) Foreign Application Priority Data

Jul. 24, 2014 (JP) .................................. 2014-150400
Sep. 16, 2014 (JP) .................................. 2014-187482

(51) Int. Cl.
*B01D 53/22* (2006.01)
*B01D 71/02* (2006.01)
(Continued)

(52) U.S. Cl.
CPC ............ *B01D 71/021* (2013.01); *B01D 53/22* (2013.01); *B01D 53/228* (2013.01); *B01D 63/04* (2013.01);
(Continued)

(58) Field of Classification Search
CPC .......... B01D 67/0067; B01D 2053/224; B01D 63/04; B01D 71/021; B01D 69/08;
(Continued)

(56) References Cited

U.S. PATENT DOCUMENTS 3,551,331 A * 12/1970 Cescon .............. B01D 67/0093
210/500.23
4,690,873 A 9/1987 Makino
(Continued)

FOREIGN PATENT DOCUMENTS

EP 0394449 A1 10/1990
EP 2281925 A2 2/2011
(Continued)

OTHER PUBLICATIONS

International Search Report and Written Opinion for International Application No. PCT/JP2015/071169, dated Oct. 20, 2015, 7 pages.
(Continued)

*Primary Examiner* — Anthony R Shumate
(74) *Attorney, Agent, or Firm* — RatnerPrestia (57) ABSTRACT

The present invention provides a carbon membrane for fluid separation with which a high-pressure fluid can be separated and purified and which has excellent pressure resistance and is less apt to be damaged. The present invention relates to a carbon membrane for fluid separation, including: a core layer which has a co-continuous porous structure; and a skin layer which has substantially no co-continuous porous structure and is formed around the core layer.

18 Claims, 1 Drawing Sheet

(51) Int. Cl.

| | | |
|---|---|---|
| *B01D 69/08* | (2006.01) | |
| *B32B 5/24* | (2006.01) | |
| *C01B 31/02* | (2006.01) | |
| *B01D 63/04* | (2006.01) | |
| *B01D 67/00* | (2006.01) | |
| *B32B 3/26* | (2006.01) | |
| *B32B 5/02* | (2006.01) | |
| *D01D 5/24* | (2006.01) | |
| *D01F 9/21* | (2006.01) | |
| *D01F 9/22* | (2006.01) | |
| *C01B 32/05* | (2017.01) | |
| *B01D 63/02* | (2006.01) | |

(52) U.S. Cl.
CPC ..... *B01D 67/0009* (2013.01); *B01D 67/0013* (2013.01); *B01D 67/0016* (2013.01); *B01D 67/0067* (2013.01); *B01D 67/0083* (2013.01); *B01D 69/08* (2013.01); *B01D 69/082* (2013.01); *B01D 71/02* (2013.01); *B32B 3/26* (2013.01); *B32B 5/022* (2013.01); *B32B 5/24* (2013.01); *C01B 31/02* (2013.01); *C01B 32/05* (2017.08); *D01D 5/24* (2013.01); *D01F 9/21* (2013.01); *D01F 9/22* (2013.01); *B01D 63/02* (2013.01); *B01D 2053/224* (2013.01); *B01D 2325/02* (2013.01); *B32B 2262/106* (2013.01); *B32B 2307/726* (2013.01); *D10B 2505/04* (2013.01); *Y02P 20/152* (2015.11)

(58) Field of Classification Search
CPC ............... B01D 53/22; B01D 53/228; B32B 2262/106; B32B 2307/726; B32B 3/26; B32B 5/022; D01F 9/22; D01F 9/21; C01B 31/02; D01D 5/24; D10B 2505/04
See application file for complete search history.

(56) References Cited

U.S. PATENT DOCUMENTS

| | | | |
|---|---|---|---|
| 5,089,135 A | 2/1992 | Yoneyama | |
| 6,579,948 B1* | 6/2003 | Tan | C08F 8/36 428/308.4 |
| 6,702,857 B2* | 3/2004 | Brauker | A61B 5/076 424/424 |
| 7,307,127 B1* | 12/2007 | Napadensky | C08F 8/36 521/28 |
| 2002/0004180 A1* | 1/2002 | Hotta | G03F 7/0045 430/311 |
| 2003/0022994 A1* | 1/2003 | Maeji | C08F 255/00 525/191 |
| 2003/0211264 A1* | 11/2003 | Farnsworth | B32B 5/18 428/36.9 |
| 2005/0251083 A1* | 11/2005 | Carr-Brendel | A61L 31/10 602/41 |
| 2007/0197890 A1* | 8/2007 | Boock | A61B 5/0031 600/365 |
| 2009/0148659 A1* | 6/2009 | Ishiodori | B01D 69/02 428/131 |
| 2010/0160466 A1* | 6/2010 | Elabd | B01D 67/0006 521/27 |
| 2010/0212503 A1 | 8/2010 | Yoshimune | |
| 2011/0003189 A1* | 1/2011 | Hildebrandt | H01M 2/1646 429/129 |
| 2016/0030625 A1* | 2/2016 | Mrozek | A61L 24/0036 424/497 |
| 2016/0046491 A1 | 2/2016 | Mihara | |
| 2016/0075914 A1* | 3/2016 | Dutta | C08J 7/047 428/319.7 |
| 2016/0362541 A1* | 12/2016 | Mihara | D01D 5/247 |
| 2017/0309923 A1* | 10/2017 | Mihara | H01M 4/926 |
| 2017/0323737 A1* | 11/2017 | Tanaka | H01G 11/32 |
| 2018/0043656 A1* | 2/2018 | Song | B32B 5/18 |

FOREIGN PATENT DOCUMENTS

| | | |
|---|---|---|
| JP | 61133118 | 6/1986 |
| JP | 0274615 | 3/1990 |
| JP | H02160924 A | 6/1990 |
| JP | 05220360 | 8/1993 |
| JP | 07089714 | 4/1995 |
| JP | 10052629 | 2/1998 |
| JP | 2003286018 | 10/2003 |
| JP | 2006176899 | 7/2006 |
| JP | 2006231095 | 9/2006 |
| JP | 2009034614 | 2/2009 |
| JP | 2013071073 | 4/2013 |
| WO | 2014148303 | 9/2014 |

OTHER PUBLICATIONS

Linkov, V.M., et al., "Carbon membranes from precursors containing low-carbon residual polymers," Nov. 2, 1994, pp. 239-242, vol. 35, No. 3, XP055449401, GN, ISSN: 0959-8103, DOI: 10.1002/pi.1994.210350304, Polymer International.

Ozaki, J., et al., "Novel preparation method for the production of mesoporous carbon fiber from a polymer blend," Jan. 2, 1997, pp. 1031-1033, vol. 35, No. 7, XP004083053, ISSN: 0008-6223, DOI: 10.1016/S0008-6223(97) 89878-8, Carbon, Elsevier, Oxford, GB.

Kim, Y.K., et al., "Carbon molecular sieve membranes derived from thermally labile polymer containing blend polymers and their gas separation properties," Aug. 3, 2004, pp. 9-17, vol. 243, No. 1-2, XP004572517, ISSN: 0376-7388, DOI: 10.1016/J.Memsci.2004.05.001, Journal of Membrane Science, Elsevier BV, NL.

Extended European Search Report for European Application No. 15 825 376.5, dated Feb. 23, 2018, 12 pages.

* cited by examiner

CARBON MEMBRANE FOR FLUID SEPARATION, FLUID SEPARATION MEMBRANE MODULE, AND METHOD FOR PRODUCING CARBON MEMBRANE FOR FLUID SEPARATION

CROSS REFERENCE TO RELATED APPLICATIONS

This is the U.S. National Phase application of PCT International Application No. PCT/JP2015/071169, filed Jul. 24, 2015, and claims priority to Japanese Patent Application No. 2014-150400, filed Jul. 24, 2014, and Japanese Patent Application No. 2014-187482, filed Sep. 16, 2014, the disclosures of each of these applications being incorporated herein by reference in their entireties for all purposes.

FIELD OF THE INVENTION

The present invention relates to a carbon membrane for fluid separation which has excellent pressure resistance, a fluid separation membrane module, and a process for producing the carbon membrane for fluid separation.

BACKGROUND OF THE INVENTION

A membrane separation method is known as a gas separation method for selectively separating a specific gas from a mixture of various gases and purifying the gas. The membrane separation method is attracting attention because this method is an energy-saving technique as compared with other gas separation methods.

As materials for gas separation membranes for use in the gas separation method, organic membranes such as polyimide membranes have been proposed. However, such organic membranes have had a problem in that these membranes are poor in heat resistance and chemical resistance (for example, Patent Document 1). Meanwhile, it has been reported to use a zeolite, which has excellent heat resistance, in a separation membrane. However, zeolite membranes have poor acid resistance. In addition, since it is difficult to form the zeolite used alone into a desired shape, it has been necessary to form a membrane thereof on a porous support. Moreover, there has also been a problem in that the steps for producing the membrane are complicated and costly (for example, Patent Document 2).

In order to solve those problems, membrane separation using a carbon membrane is attracting attention. Carbon membranes show excellent gas-separating performance and are usable even in environments where heat resistance and chemical resistance are required, and are hence expected to be put to practical use. As the carbon membranes, for example, a carbon membrane obtained by applying a resin such as a phenolic resin or polyimide to the surface of a hollow porous ceramic body and carbonizing the resin in a non-oxidizing atmosphere, has been proposed (for example, Patent Documents 3 and 4). However, the steps for producing such a carbon membrane are complicated, and the carbon membrane has been expensive. A report has been made also on a hollow-fiber carbon membrane as a self-supporting carbon membrane (for example, Patent Document 5). Hollow-fiber carbon membranes can be produced at low cost by relatively simple production steps and can be made to have a large membrane area per unit volume. Therefore, these carbon membranes have an advantage in that a compact separation membrane module can be fabricated therefrom as compared with flat membranes. Recently, reports have been made on cases where the flexibility and brittleness which were problems in carbon membranes have been improved (for example, Patent Documents 6, 7 and 8).

Patent Document

Patent Document 1: JP-A-61-133118
Patent Document 2: JP-A-7-089714
Patent Document 3: JP-A-10-52629
Patent Document 4: JP-A-2003-286018
Patent Document 5: JP-A-5-220360
Patent Document 6: JP-A-2006-231095
Patent Document 7: JP-A-2009-034614
Patent Document 8: JP-A-2013-071073

SUMMARY OF THE INVENTION

For example, in a natural-gas purification plant, it is necessary that the carbon dioxide contained as an impurity in methane gas as the main component should be separated and removed, and the separation and purification is required to be performed while maintaining a high gas pressure of several megapascals or higher, from the standpoint of efficient utilization of energy. Meanwhile, in the chemical industry, membrane separation methods have come to be used in the step of separation and purification of water contained as an impurity in alcohols or acetic acid, and it is required to perform the separation and purification at a high pressure in order to improve the permeability of the substance to be separated.

However, there are cases where the conventional hollow-fiber carbon membranes are damaged by the pressure, and these carbon membranes are insufficient in pressure resistance when used in such applications.

An object of the present invention is to provide a self-supporting carbon membrane which has excellent pressure resistance and can be used without being damaged even under high-pressure conditions.

The present inventors diligently made investigations in order to solve those problems. As a result, the inventors have found that a carbon membrane for fluid separation which has excellent pressure resistance and is less apt to be damaged even under high-pressure conditions is obtained by forming a structure including a core layer having a co-continuous porous structure and a skin layer having substantially no co-continuous porous structure.

Namely, the present invention relates to a carbon membrane for fluid separation, including: a core layer which has a co-continuous porous structure; and a skin layer which has substantially no co-continuous porous structure and is formed around the core layer.

Since a carbon membrane having excellent pressure resistance can be produced by the present invention, this carbon membrane can be applied as a separation membrane for gas separation or liquid separation that can be used even under high-pressure conditions under which the conventional self-supporting carbon membranes are difficult to use.

DETAILED DESCRIPTION OF EMBODIMENTS OF THE INVENTION

<Carbon Membrane for Fluid Separation>
The carbon membrane for fluid separation (hereinafter sometimes referred to simply as "carbon membrane" or "membrane") of an aspect of the present invention includes a core layer and a skin layer.

[Core Layer]

Figure 1:
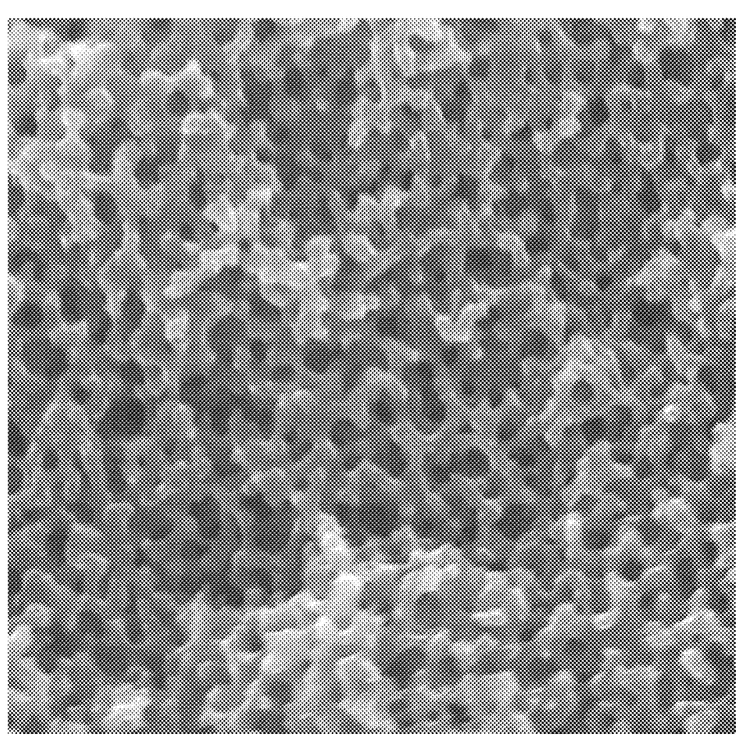
FIG. 1 is a scanning electron micrograph of the core layer of the carbon membrane of Example 1.

The core layer is a layer having a co-continuous porous structure and formed inside the skin layer, which will be described later, and is a layer, in embodiments except for a hollow-fiber carbon membrane, which will be described later, that constitutes the center of the carbon membrane for fluid separation of an aspect of the present invention. The term "co-continuous porous structure" means a structure in which branches (carbon part) and pores (voids) are respectively interconnected and regularly intertwined with each other three-dimensionally. Specifically, that term means that when a specimen which has been sufficiently cooled in liquid nitrogen is cut with tweezers or the like and the cut surface is examined with a scanning electron microscope, then a structure in which branches and voids are respectively interconnected inward, as shown in FIG. 1, is observed. This structure possessed by the core layer produces an effect in which the branches support one another to maintain the structure, and stress is dispersed throughout the whole membrane. Consequently, the carbon membrane can have high resistance to external forces such as compression and bending and have further improved pressure resistance. Furthermore, since the voids of the core layer communicate with one another three-dimensionally, the core layer functions as a channel for supplying or discharging a fluid, such as a gas or a liquid, from the skin layer to the hollow part (external-pressure mode) or from the hollow part to the skin layer (internal-pressure mode) and simultaneously functions also as a channel extending along the direction of the fiber axis.

In the case of resinous hollow-fiber membranes generally used for membrane separation, the kinds of the inner structures thereof are classified into the closed-cell type in which the pores do not communicate with one another and the interconnected porous structure type in which the pores communicate with one another. When this classification is applied to the core layer of the carbon membrane of the present invention, the core layer is classified as the interconnected porous structure type. Furthermore, as will be described later, the core layer includes a co-continuous porous structure which has so high evenness that X-ray scattering is observed therein. Because of this, the carbon membrane has enhanced pressure resistance and can be used without being damaged even when a fluid having a high pressure is supplied thereto.

It is preferable that the co-continuous porous structure of the core layer has a structural period of 0.002 to 10 μm. In cases when the structural period of the core layer is 0.002 μm or longer, the pressure loss which occurs when a fluid is passed through the voids is low and the flow rate can be heightened. Furthermore, a decrease in the pressure loss has the effect of rendering more energy-saving separation and purification possible. The structural period thereof is more preferably 0.01 μm or longer, even more preferably 0.05 μm or longer. Meanwhile, in cases when the structural period thereof is 10 μm or shorter, the carbon membrane is more resistant to forces applied in cross-sectional directions, such as compression and bending, and can hence have improved pressure resistance. The structural period thereof is more preferably 8 μm or shorter.

The structural period of the co-continuous porous structure of the core layer is calculated using the following equation from the scattering angle 2θ corresponding to the position of a peak top regarding the intensity of scattered light resulting from small-angle scattering when the carbon membrane of the present invention is irradiated with X-rays.

$$L = \frac{\lambda}{2\sin\theta} \qquad [\text{Math. 1}]$$

L: structural period (μm)
λ: wavelength of incident X-rays (μm)

It is, however, noted that there are cases where the structural period of the core layer is so long that small-angle scattering cannot be observed. In this case, a structural period is obtained through X-ray computerized tomography (X-ray CT). Specifically, a three-dimensional image captured by X-ray CT is subjected to Fourier transformation and the resultant two-dimensional spectrum is processed by circular averaging to obtain a one-dimensional spectrum. The characteristic wavelength corresponding to the position of a peak top in the one-dimensional spectrum is determined, and the structural period of the core layer is calculated as the inverse of the wavelength.

In the analysis for structural period described above, the skin layer, which will be described later, exerts no influence on the analysis because the structural period thereof is outside the range, and the structural period calculated with the above-mentioned equation is taken as the structural period of the co-continuous porous structure of the core layer.

In cases when the co-continuous porous structure of the carbon membrane for fluid separation of the present invention has high evenness, the effect of dispersing stress throughout the whole membrane can be obtained and, hence, the pressure resistance is enhanced. The evenness of the co-continuous porous structure can be determined in terms of the half-value width of a peak of scattered-light intensity observed when the carbon membrane of the present invention is irradiated with X-rays. Specifically, the smaller the half-value width of the peak of scattered-light intensity in the graph in which the abscissa is scattering angle 2θ and the ordinate is scattered-light intensity, the higher the evenness is deemed to be. The half-value width of the peak is preferably 5° or less, more preferably 1° or less, even more preferably 0.1° or less.

The term "half-value width of a peak" in the present invention means the width determined in the following manner. The vertex of the peak is called point A, and a straight line parallel with the ordinate of the graph is drawn from point A. The intersection of the straight line and the base line of the spectrum is called point B, and the width of the peak as measured at the center (point C) of the segment that connects point A and point B is taken as the half-value width. The term "width of the peak" herein means the width thereof as measured along the straight line which is parallel with the base line and passes through point C.

It is preferable that a central part of the core layer has an average porosity of 10 to 80%. The term "average porosity" means a porosity determined by obtaining a precise cross-section of an embedded specimen by the cross-section polisher method (CP method), examining the cross-section at a magnification regulated so as to result in 1±0.1 (nm/pixel) and at a resolution of 700,000 pixels or higher, setting in the resultant image a square examination region for calculation in which each side has 512 pixels, calculating a porosity using the following equation, in which C is the sectional area of the carbon membrane and D is the area of the pores, and calculating an arithmetic average for any 20 sites within the cross-section. In the case of the hollow-fiber carbon membrane, which will be described later, the hollow part is not included in the calculation of the average porosity.

Average porosity(%)=$D/C$×100

The higher the average porosity thereof, the lower the pressure loss and the more the flow velocity can be heightened when the core layer is used as a channel for gases or liquids. Meanwhile, the lower the average porosity thereof, the higher the resistance to forces applied in cross-sectional directions, such as compression and bending, and hence the more the carbon membrane is advantageous in terms of handleability and use under high pressure. Consequently, the average porosity thereof is preferably 15% or higher, more preferably 18% or higher. Meanwhile, the lower the average porosity thereof, the more the pressure resistance is improved and the more the carbon membrane can be used under high-pressure conditions. Consequently, the average porosity thereof is more preferably 75% or less, even more preferably 70% or less.

Incidentally, the term "central part" as described above means a gravity center when assuming that a cross-section of the membrane has an even mass distribution. For example, in the case where the shape of the membrane is a fiber having a round cross-section, the "central part" indicates a point where the distances from the fiber surface are the same in a cross-section of the fiber perpendicular to the fiber axis. However, in the case where the membrane has a film shape which is difficult for defining a gravity center, the "central part" thereof is defined as follows. Namely, a vertical line is drawn from the film surface in the cross-section perpendicular to MD or TD direction. Then, an aggregate of points which are placed at one-half of the film thickness on the vertical line is defined as the "central part". Additionally, in the case of a hollow-fiber carbon membrane which will be described later, the "central part" thereof is defined as follows. Namely, a vertical line is drawn from the tangent line of the outer surface of the hollow-fiber carbon membrane. Then an aggregate of points which are placed at one-half of the material thickness on the vertical line is defined as the "central part".

With respect to the average diameter of the pores in the co-continuous porous structure of the core layer of the carbon membrane of the present invention, too small values thereof result in an increase in pressure loss and hence a decrease in fluid permeability. Consequently, the average diameter thereof is more preferably 30 nm or larger, even more preferably 50 nm or larger. Meanwhile, in case where the average diameter of the pores is too large, the effect in which the carbon branches support one another to maintain the whole structure is reduced, resulting in a decrease in pressure resistance. Consequently, the average diameter thereof is preferably 3,000 nm or less, more preferably 2,500 nm or less. Here, as values of the average diameter of the pores, use is made of values obtained through a pore diameter distribution measurement by the mercury intrusion method. In the mercury intrusion method, mercury is infiltrated into pores of the co-continuous porous structure by pressure application, and the volume of the pores and the specific surface area are determined from the pressure and the amount of the mercury intruded. On the assumption that the pores are cylindrical, pore diameters are calculated from a relationship between the pore volume and the specific surface area. By the mercury intrusion method, pore diameter distribution curves in the range of 5 nm to 500 μm can be acquired. Incidentally, since the skin layer, which will be described below, has substantially no pores, the average pore diameter of the whole carbon membrane is substantially the same as the average pore diameter of the core layer.

[Skin Layer]

The skin layer is a layer which is formed around the core layer and has substantially no co-continuous porous structure, and is the layer forming an outer surface of the carbon membrane for fluid separation of the present invention. The expression "has substantially no co-continuous porous structure" means that when a cross-section formed by the cross-section polisher method (CP method) is examined at a magnification resulting in 1±0.1 (nm/pixel), then a portion in which any pores have a size less than the resolution and hence no distinct pores are observed is present over an area that is not less than the region of a square in which each side corresponds to three times the structural period L calculated from X-ray analysis as described above.

The thickness of the skin layer is not particularly limited, and can be suitably selected. However, in case where the skin layer is too thick, a membrane having such a skin layer tends to decrease in fluid permeability. Consequently, the thickness thereof is preferably 10 μm or less, more preferably 5 μm or less, even more preferably 1 μm or less. Although there is no particular lower limit thereon, the thickness of the skin layer is preferably 1 nm or larger and more preferably 100 nm or larger from the standpoint of making the skin layer maintain the shape of membrane and serving as a separation functional layer.

Due to the presence of the skin layer, which has substantially no co-continuous porous structure, in the carbon membrane, the skin layer not only has the function of a separation layer for separating and purifying a mixed fluid but also can enhance the pressure resistance.

[Shape of the Carbon Membrane]

It is preferable that the carbon membrane for fluid separation of the present invention is in the shape of a fiber or a film.

The term "in the shape of a fiber" means a fiber in which the average length of the fiber is at least 100 times the average diameter thereof and which has a core/sheath structure including a core part as the core layer and a sheath part as the skin layer. In the case where the membrane is in the shape of a fiber, there is an advantage in that in cases when a module for hollow-fiber membranes is used to fabricate a fluid separation membrane module containing a plurality of such carbon membranes mounted therein, the membrane area per unit volume can be increased as compared with the shape of a film. In addition, since the carbon membrane of a fiber shape has enhanced resistance to forces applied in cross-sectional directions, the module can be used also under high-pressure conditions, whereby it becomes possible to perform the separation with high efficiency. This configuration is hence preferred.

The cross-sectional shape of the fiber can be any desired shape such as a round cross-section, a multi-leafed cross-section, e.g., triangular shape, a flat cross-section, and a hollow cross-section. However, a round cross-section is preferred because a further improvement in pressure resistance is obtained therewith.

The average diameter of the fibers is not particularly limited, and can be arbitrarily determined. However, the average diameter thereof is preferably 10 μm or larger from the standpoint of maintaining the handleability required for module fabrication. From the standpoints of improving the flexural rigidity and improving the membrane area per unit volume of the module, the average diameter thereof is preferably 500 μm or less. The average length of the fibers can be arbitrarily determined, but is preferably 10 mm or longer from the standpoints of improving the handleability required for module fabrication and improving the fluid permeability.

Meanwhile, in the case where the membrane is in the shape of a film, the skin layer may be present on each of both surfaces of the core layer, or may be present on only one surface thereof. In the case where the skin layer is present on each of both surfaces, it is possible to supply a fluid to the core layer through a cross-section of the film and separate the fluid with the skin layers on both surfaces. In the case where the skin layer is present on one surface only, a fluid is supplied through one surface of the film and can be separated with the skin layer.

The thickness of the film is not particularly limited, and can be arbitrarily determined. However, the thickness thereof is preferably 0.01 van or larger when handleability is taken into account, and is preferably 5,000 µm or less from the standpoint of improving the flexural rigidity.

[Hollow-Fiber Carbon Membrane]

A carbon membrane having a hollow cross-section, i.e., a hollow-fiber carbon membrane for fluid separation (often referred to simply as "hollow-fiber carbon membrane"), is also an embodiment of the present invention. An explanation is given below on the case of a hollow-fiber carbon membrane for fluid separation.

The hollow-fiber carbon membrane of the present invention is a fiber-shaped carbon membrane which further has a hollow part inside the core layer. The term "hollow part" in the present invention means a cavity which is continuously formed along the fiber axis direction and which is substantially even in diameter. The hollow part, together with the core layer, functions as a channel for fluids. The presence of the hollow part reduces the pressure loss which occurs when a fluid passes in the fiber axis direction and in fiber cross-sectional directions, regardless of whether the fluid is caused to permeate in the external-pressure mode or the internal-pressure mode, and the fluid permeability hence improves as compared with carbon membranes having no hollow cross-section. Especially in the case of the internal-pressure mode, the pressure loss which occurs when a fluid passes through the core layer is lowered, and therefore, a further improvement in permeability is attained.

It is preferable that the area ratio of the cross-sectional area A of the hollow part to the cross-sectional area B of the hollow-fiber carbon membrane (area ratio of the hollow part: A/B) is 0.001 to 0.7. The higher the area ratio of the hollow part, the lower the pressure loss and the more the fluid permeability is improved. Consequently, the area ratio of the hollow part is more preferably 0.01 or higher, even more preferably 0.05 or higher. Meanwhile, the lower the area ratio of the hollow part, the higher the pressure resistance. Consequently, the area ratio of the hollow part is more preferably 0.6 or less. In cases when the area ratio of the hollow part is within that range, an excellent balance between pressure resistance and fluid permittivity is attained. Incidentally, the cross-sectional area B of the hollow-fiber carbon membrane is a cross-sectional area including the cross-sectional area A of the hollow part. From the standpoint of enabling the carbon membrane to combine pressure resistance and permeability, the membrane may have a plurality of hollow parts. In this case, the sum of the cross-sectional areas of the hollow parts is taken as the cross-sectional area A of the hollow parts.

The cross-sectional shape of the hollow-fiber carbon membrane and that of the hollow part can be any desired shape such as a round cross-section, a multi-leafed cross-section, e.g., triangular shape, and a flat cross-section. However, it is preferable that both the hollow-fiber carbon membrane and the hollow part have a round cross-sectional shape, since such a carbon membrane has further improved pressure resistance.

In the case of the hollow-fiber carbon membrane, it is preferable that the co-continuous porous structure of the core layer has a structural period of 0.05 to 3 µm. In cases when the structural period of the core layer is 0.05 µm or longer, the pressure loss which occurs when a fluid is passed through the voids is lowered and an improvement in fluid permittivity is attained. In cases when the structural period thereof is 3 µm or shorter, the carbon membrane has enhanced pressure resistance. The structural period thereof is more preferably 2.5 µm or shorter.

The average diameter of the pores in the co-continuous porous structure of the core layer is preferably 30 nm or larger, more preferably 50 nm or larger, since too small average diameters thereof result in an increase in pressure loss whereby fluid permeability is decreased. Meanwhile, since too large average diameters of the pores result in a decrease in the effect in which the carbon branches support one another to maintain the whole structure whereby pressure resistance is decreased, the average diameter of the pores is preferably 1,500 nm or less.

Meanwhile, in case where the thickness of the skin layer is too large, the fluid permeability tends to be low. Consequently, the thickness of the skin layer is preferably 5 µm or less, more preferably 3 µm or less, even more preferably 1 µm or less. Although there is no particular lower limit thereon, the thickness of the skin layer is preferably 1 nm or larger and more preferably 100 nm or larger from the standpoint of making the skin layer maintain the shape of membrane and serving as a separation functional layer.

The wall surface of the core layer, which contacts the hollow part (hereinafter sometimes referred to as "inner surface") may have pores formed therein, but need not have pores. The term "pores" herein means that when the inner surface is examined at a magnification which results in 1±0.1 (nm/pixel), distinct pores are observed. In the case where the inner surface has pores formed therein, this carbon membrane has a structure in which the core layer communicates with the hollow part, and therefore, the permeability of fluids is improved. Meanwhile, in the case where the inner surface has no pores, this inner surface also has the function of separating fluids, and therefore, this carbon membrane has improved fluid-separating performance.

Additionally, the carbon membrane for fluid separation of the present invention may further include a coat layer on outside of the skin layer. A material for forming the coat layer is not particularly limited, but various organic and inorganic polymers can be used therefor.

<Process for Producing the Carbon Membrane for Fluid Separation>

The carbon membrane for fluid separation of the present invention can be produced, for example, by a production process including: a step in which a carbonizable resin and an eliminable resin are brought into a compatibly mixed state to obtain a resin mixture (step 1); a step in which the resin mixture in a compatibly mixed state is caused to undergo phase separation and the separated phases are fixed to obtain a precursor for the carbon membrane (step 2); and a step in which the resultant precursor is carbonized by pyrolysis (step 3).

[Step 1]

Step 1 is a step in which 10 to 90% by weight of a carbonizable resin and 90 to 10% by weight of an eliminable resin are brought into a compatibly mixed state to obtain a resin mixture.

The carbonizable resin is a resin which carbonizes upon pyrolysis and remains as branches (carbon part), and both a thermoplastic resin and a thermosetting resin can be used. In the case of a thermoplastic resin, it is preferred to select a resin which can be rendered infusible by a simple process such as heating or irradiation with high-energy rays. In the case of a thermosetting resin, there are many cases where a treatment for imparting infusibility is unnecessary, and thermosetting resins also are included in suitable materials. Examples of the thermoplastic resin include poly(phenylene oxide), poly(vinyl alcohol), polyacrylonitrile, phenolic resins, and wholly aromatic polyesters. Examples of the thermosetting resin include unsaturated polyester resins, alkyd resins, melamine resins, urea resins, polyimide resins, diallyl phthalate resins, lignin resins, and urethane resins. These resins may be used either alone or in a mixed state. However, from the standpoint of ease of molding, it is also preferred to mix thermoplastic resins or mix thermosetting resins.

It is preferred to use thermoplastic resins among those from the standpoints of carbonization yield, moldability, and profitability. It is more preferred to use poly(phenylene oxide), poly(vinyl alcohol), polyacrylonitrile, or a wholly aromatic polyester.

Meanwhile, the eliminable resin is a resin which can be removed subsequently to step 2, which will be described layer, in any of the following stages: simultaneously with a treatment for imparting infusibility; after the treatment for imparting infusibility; and simultaneously with the pyrolysis. Methods for removing the eliminable resin are not particularly limited, and it is preferred to use methods such as the following: a method in which the eliminable resin is chemically removed, for example, by conducting depolymerization using a chemical; a method in which the eliminable resin is dissolved away by adding a solvent capable of dissolving the eliminable resin; and a method in which the resin mixture is heated to lower the molecular weight of the eliminable resin by thermal decomposition, thereby removing the eliminable resin. These techniques can be used alone or in combination thereof. In the case of using a combination, the techniques may be simultaneously performed or separately performed.

As the method in which the resin is chemically removed, a method in which the resin is hydrolyzed using an acid or an alkali is preferred from the standpoints of profitability and handleability. Examples of resins which are susceptible to hydrolysis by acids or alkalis include polyesters, polycarbonates, and polyamides.

Preferred examples of the method in which the eliminable resin is removed by adding a solvent capable of dissolving the eliminable resin include: a method in which the solvent is continuously supplied to the carbonizable resin and eliminable resin which have been mixed, thereby dissolving and removing the eliminable resin; and a method in which the solvent and the resins are mixed batchwise to dissolve and remove the eliminable resin.

Specific examples of the eliminable resin which are suitable for the method of removing by solvent addition include polyolefins such as polyethylene, polypropylene, and polystyrene, acrylic resins, methacrylic resins, polyvinylpyrrolidone, aliphatic polyesters, and polycarbonates. Of these, amorphous resins are preferred from the standpoint of solubility in the solvent, and examples thereof include polystyrene, methacrylic resins, and polycarbonates.

Examples of the method in which the eliminable resin is lowered in molecular weight by thermal decomposition and removed thereby include: a method in which the carbonizable resin and eliminable resin that have been mixed are heated batchwise to decompose the eliminable resin; and a method in which the carbonizable resin and eliminable resin that have been continuously mixed are continuously supplied to a heating source and heated to thereby decompose the eliminable resin.

It is preferable that the eliminable resin is, among those resins, a resin that disappears in step 3, which will be described later, through thermal decomposition when the carbonizable resin is carbonized by pyrolysis. It is preferable that the eliminable resin is a thermoplastic resin that does not undergo a large chemical change when the carbonizable resin is subjected to the treatment for imparting infusibility, which will be described later, and that, through pyrolysis, gives a carbonization yield of less than 10%. Specific examples of such eliminable resins include polyolefins such as polyethylene, polypropylene, and polystyrene, acrylic resins, methacrylic resins, polyacetals, polyvinylpyrrolidone, aliphatic polyesters, aromatic polyesters, aliphatic polyamides, and polycarbonates. These resins may be used either alone or in a mixed state.

In step 1, the carbonizable resin and the eliminable resin are brought into a compatibly mixed state to obtain a resin mixture (polymer alloy). The expression "brought into a compatibly mixed state" herein means that by suitably selecting conditions regarding temperature and/or solvent, a state that no structure in which the carbonizable resin and the eliminable resin are present as separate phases is observed with an optical microscope, is produced.

The carbonizable resin and the eliminable resin may be brought into a compatibly mixed state by mixing the resins alone with each other or by further adding a solvent thereto.

Examples of a system in which a plurality of resins have been brought into a compatibly mixed state include: a system which shows a phase diagram of the upper-limit critical solution temperature (UCST) type in which the resins are in a phase-separated state at low temperatures but form a single phase at high temperatures; and a system which conversely shows a phase diagram of the lower-limit critical solution temperature (LCST) type in which the resins are in a phase-separated state at high temperatures but form a single phase at low temperatures. Furthermore, especially in the case of a system in which at least one of the carbonizable resin and the eliminable resin has been dissolved in a solvent, preferred examples include one in which the phase separation, which will be described later, is induced by the infiltration of a nonsolvent.

The solvent to be added is not particularly limited. Preferred is such a solvent that the absolute value of the difference between the solubility parameter (SP value) thereof and the average of the SP values of the carbonizable resin and eliminable resin is 5.0 or less, the absolute value being an index to dissolving properties. It is known that the smaller the absolute value of the difference from the average of the SP values, the higher the dissolving properties. It is therefore preferable that the difference is zero. Meanwhile, the larger the absolute value of the difference from the average of the SP values, the lower the dissolving properties and the more the compatibly mixed state of the carbonizable resin and eliminable resin is difficult to attain. In view of this, the absolute value of the difference from the average of the SP values is preferably 3.0 or less, most preferably 2.0 or less.

Specific examples of carbonizable resin/eliminable resin combinations to be brought into a compatibly mixed state, in the case where the system contains no solvent, include poly(phenylene oxide)/polystyrene, poly(phenylene oxide)/styrene-acrylonitrile copolymer, wholly aromatic polyester/poly(ethylene terephthalate), wholly aromatic polyester/poly(ethylene naphthalate), and wholly aromatic polyester/polycarbonate. Specific examples of the combinations, in the case where the system contains a solvent, include polyacrylonitrile/poly(vinyl alcohol), polyacrylonitrile/polyvinylphenol, polyacrylonitrile/polyvinylpyrrolidone, polyacrylonitrile/poly(lactic acid), poly(vinyl alcohol)/vinyl acetate-vinyl alcohol copolymer, poly(vinyl alcohol)/poly(ethylene glycol), poly(vinyl alcohol)/poly(propylene glycol), and poly(vinyl alcohol)/starch.

Methods for mixing the carbonizable resin with the eliminable resin are not limited, and various known mixing techniques can be employed so long as even mixing is possible therewith. Examples thereof include a rotary mixer having stirring blades and a kneading extruder with screws.

It is preferable that the temperature (mixing temperature) at which the carbonizable resin and the eliminable resin are mixed together is not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be suitably selected. By setting the mixing temperature at a temperature not lower than the temperature at which both the carbonizable resin and the eliminable resin soften, the viscosity of the two resins can be lowered and, hence, more efficient stirring and mixing are possible. There is no particular upper limit on the mixing temperature, but the temperature is preferably 400° C. or lower from the standpoint of preventing resin deterioration due to thermal degradation, thereby obtaining a carbon membrane precursor having excellent quality.

In step 1, 10 to 90% by weight of the carbonizable resin is mixed with 90 to 10% by weight of the eliminable resin. In cases when the proportions of the carbonizable resin and eliminable resin are within those ranges, an optimal pore size and an optimal porosity can be arbitrarily designed. Those proportion ranges are hence preferred. So long as the proportion of the carbonizable resin is 10% by weight or larger, not only it is possible to give a carbonized membrane which retains mechanical strength but also an improved yield results; such proportions are hence preferred. Meanwhile, so long as the proportion of the carbonizable material is 90% by weight or less, the eliminable resin can efficiently form voids; such proportions are hence preferred.

A mixing ratio between the carbonizable resin and the eliminable resin can be arbitrarily selected within the range while taking account of the compatibility of each material. Specifically, since compatibility between resins generally becomes worse as the ratio therebetween approaches 1:1, preferred embodiments in the case where a system having not so high compatibility has been selected as starting materials include one in which the compatibility is improved by making the mixture approach to a so-called partial composition by increasing or reducing the amount of the carbonizable resin.

It is also preferred to add a solvent when the carbonizable resin and the eliminable resin are mixed with each other. The addition of a solvent not only lowers the viscosity of the carbonizable resin and eliminable resin to facilitate molding but also renders the carbonizable resin and the eliminable resin easy to bring into a compatibly mixed state. The solvent here is also not particularly limited, and any solvent which is liquid at ordinary temperature and in which at least one of the carbonizable resin and the eliminable resin is soluble or swellable may be used. A solvent in which both the carbonizable resin and the eliminable resin dissolve is more preferred because the compatibility between both resins can be improved.

It is preferable that the amount of the solvent to be added is 20% by weight or larger based on the total weight of the carbonizable resin and the eliminable resin, from the standpoints of improving the compatibility between the carbonizable resin and the eliminable resin and lowering the viscosity thereof to improve the flowability. Meanwhile, from the standpoint of the cost of the recovery and recycling of the solvent, the addition amount thereof is preferably 90% by weight or less based on the total weight of the carbonizable resin and the eliminable resin.

[Step 2]

Step 2 is a step in which the resin mixture that has been brought into a compatibly mixed state in step 1 is caused to undergo phase separation to form a microstructure and this microstructure is fixed. In the case of obtaining the carbon membrane for fluid separation of an embodiment of the present invention described above, it is necessary to form a co-continuous phase separation structure as the microstructure.

Methods by which the carbonizable resin and eliminable resin that have been mixed together are caused to undergo phase separation are not particularly limited. Examples thereof include: a heat-induction phase separation method in which phase separation is induced by a temperature change; and a nonsolvent-induction phase separation method in which phase separation is induced by adding a nonsolvent.

These phase separation methods can be used alone or in combination thereof. Specific examples of methods in the case of using a combination include: a method in which the mixture is passed through a coagulating bath to cause nonsolvent-induced phase separation and is then heated to cause heat-induced phase separation; a method in which nonsolvent-induced phase separation and heat-induced phase separation are simultaneously caused by controlling the temperature of a coagulating bath; and a method in which the material ejected from a spinning nozzle is cooled to cause heat-induced phase separation and is then brought into contact with a nonsolvent.

Meanwhile, in the case of obtaining a hollow-fiber carbon membrane, step 2 is a step in which the resin mixture that has been brought into a compatibly mixed state in step 1 is spun into a hollow fiber and is caused to undergo phase separation to form a microstructure and the microstructure is fixed.

In this case, it is preferred to cause phase separation simultaneously with the spinning. Examples of such methods include a method in which either the compatibly mixed resin mixture produced in step 1 or a compatibly-mixed-resin solution to which a solvent has been added is extruded from the outer orifice of a hollow-fiber spinning nozzle having a double-pipe structure and a gas, e.g., air or nitrogen, the same solvent as that used in the spinning dope, a solution in which the eliminable resin has dissolved, a nonsolvent, or a mixture of these is extruded from the inner orifice of the spinning nozzle.

The extrudate is subsequently passed through a coagulating bath and then dried to thereby form a microstructure. Thus, a precursor for the hollow-fiber carbon membrane for fluid separation can be obtained. Examples of the coagulating bath include water, alcohols, saturated aqueous sodium chloride solution, and mixed solvents composed of any of these and the solvent used in step 1. In the case where a solvent or a solution of the eliminable resin is ejected from the inner orifice, use may be made of a method in which the extrudate is immersed in a coagulating bath before a drying step to dissolve away the solvent and eliminable resin which have been ejected from the inner orifice.

[Removal of the Eliminable Resin]

It is preferable that the carbon membrane precursor obtained in step 2 is subjected to a treatment for removing the eliminable resin, before the precursor is subjected to the carbonization step (step 3) and/or simultaneously with the carbonization step. Methods for the removal treatment are not particularly limited. Examples thereof include: a method in which the eliminable resin is chemically decomposed and lowered in molecular weight using an acid, alkali, or enzyme and is removed thereby; a method in which the eliminable resin is dissolved away with a solvent capable of dissolving the eliminable resin; and a method in which the eliminable resin is decomposed and removed using radiation, such as electron beams, gamma rays, ultraviolet rays, or infrared rays, or heat.

In particular, in the case where the eliminable resin can be removed through thermal decomposition, use can be made of: a method in which a heat treatment is performed beforehand at a temperature at which 80% by weight or more of the eliminable resin disappears; or a method in which the eliminable resin is gasified by thermal decomposition and removed in the carbonization step (step 3) or in the treatment for imparting infusibility which will be described below. The method in which the eliminable resin is gasified by thermal decomposition and removed simultaneously with a heat treatment in the carbonization step (step 3) or in the treatment for imparting infusibility which will be described below is preferred because the production efficiency is heightened.

[Treatment for Imparting Infusibility]

It is preferable that the carbon membrane precursor obtained in step 2 is subjected to a treatment for imparting infusibility, before being subjected to the carbonization step (step 3). Methods for the treatment for imparting infusibility are not particularly limited, and known methods can be used. Specific examples of the methods include: a method in which the precursor is heated in the presence of oxygen to thereby cause oxidative crosslinking; a method in which the precursor is irradiated with high-energy rays such as electron beams or gamma rays to form a crosslinked structure; and a method in which a substance having a reactive group is immersed or mixed to form a crosslinked structure. Of these, the method in which the precursor is heated in the presence of oxygen to thereby cause oxidative crosslinking is preferred because the process is simple and the production cost can be reduced. These techniques can be used alone or in combination thereof, and the techniques may be used either simultaneously or separately.

The heating temperature in the method in which the precursor is heated in the presence of oxygen to thereby cause oxidative crosslinking is preferably 150° C. or higher from the standpoint of causing the crosslinking reaction to proceed efficiently, but is preferably 350° C. or lower from the standpoint of preventing the yield from being impaired by a weight loss due to the thermal degradation, combustion, etc. of the carbonizable resin.

There are no particular limitations on oxygen concentration during the treatment. However, to supply a gas having an oxygen concentration of 18% or higher is preferred because use of such gas makes it possible to reduce the production cost. Methods for supplying the gas are not particularly limited, and examples thereof include a method in which air is supplied as such to the heating device and a method in which pure oxygen is supplied to the heating device using, for example, a bomb.

Examples of the method in which the precursor is irradiated with high-energy rays such as electron beams or gamma rays to form a crosslinked structure include a method in which a commercial device such as an electron beam generator or gamma ray generator is used to irradiate the carbonizable resin with electron beams or gamma rays to thereby induce crosslinking. A lower limit of the irradiation intensity is preferably 1 kGy or higher from the standpoint of efficiently introducing a crosslinked structure by the irradiation, and the irradiation intensity is preferably 1,000 kGy or less from the standpoint of preventing the membrane strength from being reduced by a decrease in molecular weight due to cleavage of the main chain.

Examples of the method in which a substance having a reactive group is immersed or mixed to form a crosslinked structure include: a method in which a low-molecular-weight compound having a reactive group is immersed into the carbon membrane precursor and the precursor is heated or irradiated with high-energy rays to cause a crosslinking reaction to proceed; and a method in which a low-molecular-weight compound having a reactive group is mixed beforehand and the precursor is heated or irradiated with high-energy rays to cause a crosslinking reaction to proceed.

[Step 3]

Step 3 is a step in which either the carbon membrane precursor obtained in step 2 or the precursor which, according to need, has undergone the removal of the eliminable resin and/or the treatment for imparting infusibility is pyrolyzed and carbonized to obtain a carbon membrane.

It is preferable that the pyrolysis is conducted by heating the carbon membrane precursor in an inert gas atmosphere to 400° C. or higher in order to sufficiently carbonize the precursor. The term "inert gas" herein means a gas which is chemically inert during the heating. Examples thereof include helium, neon, nitrogen, argon, krypton, xenon, and carbon dioxide. From the standpoint of profitability, it is preferred to use nitrogen or argon among these. The temperature is preferably 1,500° C. or lower because too high temperatures tend to result in a brittle carbon membrane.

The flow rate of the inert gas is not limited so long as the oxygen concentration in the atmosphere within the heating device can be sufficiently lowered, and it is preferred to suitably select an optimal value in accordance with the size of the heating device, the supplied amount of the carbon membrane precursor, heating temperature, etc. Although there is no particular upper limit on the flow rate thereof, it is preferred to suitably set the flow rate in accordance with a temperature distribution or the design of the heating device, from the standpoints of profitability and of reducing temperature differences within the heating device.

With respect to heating methods in the case where the carbonization treatment is continuously performed, use may be made of a method in which the membrane is continuously fed to and taken out from the heating device kept at a constant temperature, using rollers, conveyor, or the like. This method is preferred because the production efficiency can be heightened.

Meanwhile, in the case where a batch treatment is conducted in a heating device, there is no particular lower limit on the heating rate and cooling rate. However, rates of 1° C./min or higher are preferred because the time period required for the heating and cooling can be shortened therewith to thereby heighten the production efficiency. There is no particular upper limit on the heating rate and cooling rate. It is, however, preferred to employ a rate which is lower than the thermal shock resistance of the member that constitutes the heating device.

EXAMPLES

Preferred examples for carrying out the present invention are described below, but the following description should not be construed as limiting the present invention.
Evaluation Methods
(Presence or Absence of Co-Continuous Porous Structure)

A hollow-fiber carbon membrane was sufficiently cooled in liquid nitrogen and then cut with tweezers, and a core layer portion of the resultant cut surface was examined with a scanning electron microscope. In cases when a structure in which carbon-framework branches and pores (voids) had been respectively interconnected and had been regularly intertwined with each other three-dimensionally was observed, this carbon membrane was deemed to have a co-continuous porous structure.

(Average Porosity)

A carbon membrane is embedded in a resin, and a cross-section of the carbon membrane is thereafter exposed with a razor blade or the like. Using sputtering device SM-09010, manufactured by JEOL Ltd., argon ion beams were caused to strike on the specimen surface at an accelerating voltage of 5.5 kV to etch the surface. A central part of the resultant cross-section of the carbon membrane was examined with scanning electron microscope S-5500, manufactured by Hitachi High-Technologies Corp., at such a magnification as to result in 1±0.1 (nm/pixel) and at a resolution of 700,000 pixels or higher, and a square region in the membrane cross-section which was necessary for calculation and in which each side thereof had 512 pixels was set on the image obtained through the microscopic examination. The cross-sectional area of the carbon membrane and the area of the pores were expressed by C and D, respectively, and the porosity was determined using the following equation. An average porosity was calculated by obtaining an arithmetic average of any 20 sites within the cross-section.

Average porosity(%)=$C/D \times 100$ (Acquisition of Pore Diameter Distribution Curve)

A carbon membrane which had been pulverized with a ball mill was vacuum-dried under the conditions of 300° C. and 5 hours to remove any gases which had been adsorbed. Thereafter, a pore diameter distribution curve was acquired using an automatic porosimeter (AutoPore IV9500) manufactured by Shimadzu Corp.

(Structural Period)

A carbon membrane was sandwiched between specimen plates, and the position of a CuKα line source and the positions of the specimen and a two-dimensional detector were regulated so that information on scattering angles less than 10 degrees was obtained from the X-ray source obtained from the CuKα line source. From the image data (luminance information) obtained from the two-dimensional detector, the data on the central portion which had been affected by the beam stopper were excluded.

Radius vectors from the beam center were set, and the values of luminance for the range of 360° at angular intervals of 1° were summed up to obtain a scattered-light-intensity distribution curve. From the scattering angle 2θ corresponding to the position of a peak in the curve obtained, the structural period of the interconnected-structure portion was obtained using the following equation.

$$L = \frac{\lambda}{2\sin\theta}$$ [Math. 2]

L: structural period (µm)
λ: wavelength of incident X-rays (µm)

In the case where the structural period was 1 µm or longer and no peak of X-ray scattering was observed, continuous rotation image were captured with an X-ray microscope at steps of 0.3° over a range of 180° or more to obtain a CT image. The CT image obtained was subjected to Fourier transformation, and the resultant two-dimensional spectrum was processed by circular averaging to obtain a one-dimensional spectrum. The characteristic wavelength corresponding to the position of a peak top in the one-dimensional spectrum was determined, and the structural period was obtained as the inverse of the wavelength.

(Flexibility of Carbon Membrane)

A carbon membrane was wound over 180° or more around each of cylinders having various diameters, and was examined as to whether the membrane ruptured or not. The cylinder which was the smallest in radius among the cylinders that did not cause a membrane rupture was determined, and the bend radius was expressed in terms of the radius of that cylinder.

(Compressive Strength in Cross-Sectional Direction of Fiber)

Using a miniature compression tester manufactured by Shimadzu Corp., one hollow-fiber carbon membrane having a length of 1 mm was sandwiched between jigs and compressed in a cross-sectional direction of the hollow-fiber carbon membrane at a speed of 0.1 mm/min to measure the compression displacements and the loads. The compressive strength σ was calculated using the following equation by determining an arithmetic average for ten hollow-fiber carbon membranes.

$$\sigma = \frac{2F}{\pi dl}$$ [Math. 3]

σ: compressive strength (MPa) in cross-sectional direction of fiber
F: breaking load (N)
d: fiber diameter (mm) of the carbon membrane
l: fiber length (mm) of the carbon membrane (Evaluation of Gas-Separating Performance)

A plurality of fiber-shaped carbon membranes was bundled, and the ends of the bundled carbon membranes were sealed with an epoxy-resin-based adhesive to fabricate a separation membrane module made of stainless steel. In this module, the carbon membranes had a membrane area of 3.0 cm². The difference in pressure between the gas feed side and the permeation side was set at 0.5 MPa, and single-component gases were fed thereto in the external-pressure mode. In accordance with the pressure difference method as provided in ISO 15105-1:2002, the gas-separating performance of the carbon membranes was determined at a measuring temperature of 25° C. The permeation rate Q of each gas which had passed through the carbon membranes was calculated using the following equation, and the gas separation factor α was calculated as the permeation rate ratio between the single-component gases. Incidentally, "STP" means standard conditions.

$$Q=[\text{gas permeation rate } (cm^3 \cdot STP)]/[(\text{membrane area } (cm^2)) \times (\text{time } (s)) \times (\text{pressure difference } (cmHg))]$$

Example 1

Into a separable flask were introduced 70 g of polyacrylonitrile (Mw, 150,000) manufactured by Polysciences, Inc., 70 g of polyvinylpyrrolidone (Mw, 40,000) manufactured by Aldrich Co., and 400 g of dimethyl sulfoxide (DMSO) manufactured by Wako Pure Chemical Industries, Ltd., as a solvent. The contents were heated at 150° C. for 3 hours with stirring and refluxing, thereby preparing an even and transparent solution. In this solution, the concentration of the polyacrylonitrile and the concentration of the polyvinylpyrrolidone were 10% by weight each.

The solution obtained was cooled to 25° C. and then ejected at a rate of 3 mL/min from a one-orifice nozzle having an orifice diameter of 0.6 mm, and the extrudate was led into a pure-water coagulating bath kept at 25° C., subsequently taken off at a rate of 5 m/min, and accumulated in a vat to thereby obtain raw fibers. In this operation, the air gap was set at 5 mm, and the length of immersion in the coagulating bath was 15 cm. The raw fibers obtained were translucent and had undergone phase separation.

The raw fibers obtained were dried for 1 hour in a circulating drying oven kept at 25° C., thereby removing the water present on the fiber surface. Thereafter, vacuum drying was conducted at 25° C. for 5 hours to obtain dried raw fibers.

The raw fibers were thereafter introduced into an electric furnace kept at 250° C. and heated in an oxygen atmosphere for 1 hour, thereby performing a treatment for imparting infusibility. The raw fibers which had undergone the treatment for imparting infusibility were changed to black in color.

The infusible raw fibers obtained were subjected to a carbonization treatment under the conditions of a nitrogen flow rate of 1 L/min, heating rate of 10° C./min, maximum temperature of 600° C., and holding time of 5 minutes, thereby obtaining carbon membranes. In the core layer of each of the carbon membranes obtained, a co-continuous porous structure was formed. The structure and properties of the carbon membranes obtained are shown in Table 1.

Next, a separation membrane module including the carbon membranes was fabricated and subjected to the examination on the permeation of single-component gases. The results thereof are shown in Table 1.

Example 2

Carbon membranes were obtained in the same manner as in Example 1, except that the maximum temperature was changed to 700° C. In the core layer of each of the carbon membranes obtained, a co-continuous porous structure was formed. The structure and properties of the carbon membranes obtained are shown in Table 1.

Next, a separation membrane module including the carbon membranes was fabricated and subjected to the examination on the permeation of single-component gases. The results thereof are shown in Table 1.

Example 3

Carbon membranes were obtained in the same manner as in Example 1, except that the maximum temperature was changed to 800° C. In the core layer of each of the carbon membranes obtained, a co-continuous porous structure was formed. The structure and properties of the carbon membranes obtained are shown in Table 1.

Next, a separation membrane module including the carbon membranes was fabricated and subjected to the examination on the permeation of single-component gases. The results thereof are shown in Table 1.

Example 4

Carbon membranes were obtained in the same manner as in Example 1, except that the concentration of polyacrylonitrile and that of polyvinylpyrrolidone were each changed to 13% by weight and that the maximum temperature was changed to 1,500° C. In the core layer of each of the carbon membranes obtained, a co-continuous porous structure was formed. The structure and properties of the carbon membranes obtained are shown in Table 1.

Next, a separation membrane module including the carbon membranes was fabricated and subjected to the examination on the permeation of single-component gases. The results thereof are shown in Table 1.

The present invention is explained below by reference to Examples with respect to the case where the carbon membrane of the present invention is a hollow-fiber carbon membrane for fluid separation.

Example 5

The polymer solution prepared in Example 1 was cooled to 25° C. Thereafter, the spinning solution prepared above was ejected at 3 mL/min from the outer orifice of a hollow-fiber spinning nozzle having a double-pipe structure, and nitrogen gas was simultaneously ejected from the inner orifice of the nozzle. The extrudate was led into a pure-water coagulating bath kept at 25° C., subsequently taken off at a rate of 5 m/min, and accumulated in a vat to thereby obtain raw fibers for hollow fibers. In this operation, the air gap was set at 5 mm, and the length of immersion in the coagulating bath was 15 cm. The raw fibers obtained were translucent and had undergone phase separation.

The raw fibers obtained were dried for 1 hour in a circulating drying oven kept at 25° C., thereby removing the water present on the fiber surface. Thereafter, vacuum drying was conducted at 25° C. for 5 hours to obtain dried raw fibers as a precursor for hollow-fiber carbon membranes.

The raw fibers were thereafter introduced into an electric furnace kept at 250° C. and heated in an oxygen atmosphere for 1 hour, thereby performing a treatment for imparting infusibility. The raw fibers which had undergone the treatment for imparting infusibility were changed to black in color.

The infusible raw fibers obtained were subjected to a carbonization treatment under the conditions of a nitrogen flow rate of 1 L/min, heating rate of 10° C./min, maximum temperature of 600° C., and holding time of 5 minutes, thereby obtaining hollow-fiber carbon membranes. In the core layer of each of the hollow-fiber carbon membranes obtained, a co-continuous porous structure was formed, and the area ratio of the hollow part was 0.15. The structure and properties of the carbon membranes obtained are shown in Table 1.

Next, a separation membrane module including the carbon membranes was fabricated and subjected to the examination on the permeation of single-component gases. The results thereof are shown in Table 1.

Example 6

Hollow-fiber carbon membranes were obtained in the same manner as in Example 5, except that the area ratio of the hollow part was changed to 0.25 by regulating the ejection rates of the spinning solution and nitrogen gas. In the core layer of each of the hollow-fiber carbon membranes obtained, a co-continuous porous structure was formed. The structure and properties of the hollow-fiber carbon membranes obtained are shown in Table 1.

Next, a separation membrane module including the carbon membranes was fabricated and subjected to the examination on the permeation of single-component gases. The results thereof are shown in Table 1.

Example 7

Hollow-fiber carbon membranes were obtained in the same manner as in Example 5, except that the area ratio of the hollow part was changed to 0.5 by regulating the ejection rates of the spinning solution and nitrogen gas. In the core layer of each of the hollow-fiber carbon membranes obtained, a co-continuous porous structure was formed. The structure and properties of the hollow-fiber carbon membranes obtained are shown in Table 1.

Next, a separation membrane module including the carbon membranes was fabricated and subjected to the examination on the permeation of single-component gases. The results thereof are shown in Table 1.

Example 8

Hollow-fiber carbon membranes were obtained in the same manner as in Example 5, except that the area ratio of the hollow part was changed to 0.73 by regulating the ejection rates of the spinning solution and nitrogen gas. In the core layer of each of the hollow-fiber carbon membranes obtained, a co-continuous porous structure was formed. The structure and properties of the hollow-fiber carbon membranes obtained are shown in Table 1.

Next, a separation membrane module including the carbon membranes was fabricated and subjected to the examination on the permeation of single-component gases. The results thereof are shown in Table 1.

Comparative Example 1

Into a separable flask were introduced 50 g of polyacrylonitrile (Mw, 150,000) manufactured by Polysciences, Inc. and 200 g of dimethyl sulfoxide (DMSO) manufactured by Wako Pure Chemicals Industries, Ltd., as a solvent. The contents were heated at 150° C. for 3 hours with stirring and refluxing, thereby preparing an even and transparent solution. In this solution, the concentration of the polyacrylonitrile was 20% by weight.

Spinning and pyrolysis were conducted in the same manner as in Example 5 to obtain hollow-fiber carbon membranes. In the carbon membranes, the area ratio of the hollow part was 0.25. The cross-section of the hollow-fiber carbon membranes obtained had an evenly dense structure, and no co-continuous porous structure was observed. The structure and properties of the hollow-fiber carbon membranes obtained are shown in Table 1.

Next, a separation membrane module including the carbon membranes was fabricated and subjected to the examination on permeation of single-component gases. However, the gas permeation rates were too low to measure.

Comparative Example 2

Into a separable flask were introduced 99 mmol of 3,3', 4,4'-biphenyltetracarboxylic dianhydride, 60 mmol of 4,4'-diaminodiphenyl ether, 30 mmol of 3,5-diaminobenzoic acid, and 10 mmol of 4,4'-diaminodiphenylmethane together with 253 g of para-chlorophenol. The mixture was polymerized at 180° C. for 13 hours with stirring to obtain an aromatic-polyimide solution having a concentration of the aromatic polyimide of 15% by weight.

The spinning solution prepared above was ejected from the outer orifice of a hollow-fiber spinning nozzle having a double-pipe structure, and nitrogen gas was simultaneously ejected from the inner orifice thereof. The extrudate was immersed in a coagulating bath which was constituted of 65% by weight aqueous ethanol solution and which was kept at 25° C., and was thereafter taken off at a rate of 5 m/min and accumulated in a vat to thereby obtain raw fibers for aromatic-polyimide hollow fibers. Subsequently, the raw fibers were sufficiently washed with ethanol and then dried for 1 hour in a 100° C. circulating drying oven. Thereafter, vacuum drying was conducted at 100° C. for 10 hours to obtain asymmetrical hollow-fiber membranes made of an aromatic polyimide.

Next, the hollow-fiber membranes were heat-treated at a temperature of 260° C. for 30 minutes. Thereafter, in an oven filled with an air atmosphere, the hollow-fiber membranes were heat-treated at 270° C. for 38 hours and further subjected to a preliminary heat treatment at 400° C. for 30 minutes to impart thermal stability thereto. Subsequently, a carbonization treatment was conducted under the conditions of a nitrogen flow rate of 1 L/min, heating rate of 10° C./min, maximum temperature of 700° C., and holding time of 5 minutes thereby obtaining hollow-fiber carbon membranes.

A cross-section of the hollow-fiber carbon membranes obtained was examined. As a result, a dense layer was observed as a fiber surface layer, and a porous structure was observed inside the dense layer; the porous structure was of the closed-cell type. The structure and properties of the hollow-fiber carbon membranes are shown in Table 1.

Next, a separation membrane module including the carbon membranes was fabricated and subjected to the examination on the permeation of single-component gases. The results thereof are shown in Table 1.

TABLE 1

| | Core layer | | | | | Skin layer | Hollow part Area |
|---|---|---|---|---|---|---|---|
| | Co-continuous Porous structure | Structural period μm | Half-value width ° | Average porosity % | Average diameter of pores nm | (surface dense layer) Thickness μm | ratio of hollow part % |
| Example 1 | present | 0.076 | 0.04 | 57 | 82 | 5 | 0 |
| Example 2 | present | 0.073 | 0.05 | 52 | 64 | 5 | 0 |
| Example 3 | present | 0.067 | 0.05 | 52 | 55 | 5 | 0 |
| Example 4 | present | 0.086 | 0.04 | 43 | 47 | 5 | 0 |
| Example 5 | present | 0.096 | 0.05 | 45 | 85 | 5 | 0.15 |
| Example 6 | present | 0.092 | 0.04 | 48 | 80 | 5 | 0.25 |
| Example 7 | present | 0.088 | 0.04 | 51 | 82 | 5 | 0.5 |
| Example 8 | present | 0.086 | 0.05 | 53 | 75 | 5 | 0.73 |
| Comparative Example 1 | absent | — | — | 0 | 12 | — | 0.25 |
| Comparative Example 2 | absent (closed cell type) | — | — | 28 | 46 | 20 | 0.72 |

| | Fiber diameter μm | Bend radius mm | Compressive strength MPa | Gas permeation rate Q | | Separation factor α $CO_2/CH_4$ |
|---|---|---|---|---|---|---|
| | | | | $CO_2$ ($\times 10^{-6} cm^3 \cdot STP/cm^2 \cdot s \cdot cmHg$) | $CH_4$ | |
| Example 1 | 250 | 4.2 | 30.1 | 8.6 | 0.1 | 82 |
| Example 2 | 230 | 5.2 | 26.5 | 11.5 | 0.27 | 42 |
| Example 3 | 220 | 7.5 | 24.9 | 18.3 | 1.53 | 12 |
| Example 4 | 150 | 9.8 | 21.2 | 2.2 | 0.58 | 3.8 |
| Example 5 | 250 | 2.8 | 22.5 | 32.3 | 0.34 | 95 |
| Example 6 | 240 | 3.4 | 18.2 | 35.1 | 0.47 | 75 |
| Example 7 | 220 | 6.5 | 10.4 | 39.7 | 0.6 | 66 |
| Example 8 | 260 | 7.6 | 2.3 | 40 | 0.58 | 69 |
| Comparative Example 1 | 230 | 6.7 | 21.2 | — | — | — |
| Comparative Example 2 | 270 | 14.5 | 2.1 | 59 | 1.3 | 45 |

This application is based on Japanese Patent Applications No. 2014-150400, filed on Jul. 24, 2014 and No. 2014-187482 filed on Sep. 16, 2014, the contents of which are incorporated herein by reference.

The carbon membrane for fluid separation of the present invention is useful as a carbon membrane for separating fluids such as gases and liquids. In particular, the carbon membrane is useful in fields such as the separation and recovery of carbon dioxide, separation of and recovery of discharge gases, recovery of hydrogen, dehumidification of gases, and production of oxygen or nitrogen from air.

The invention claimed is:

1. A carbon membrane for fluid separation, comprising: a core layer which has a co-continuous porous structure; and a skin layer which has substantially no co-continuous porous structure and is formed around the core layer, wherein the co-continuous porous structure of the core layer has a structural period of 0.002 to 10 μm.

2. The carbon membrane for fluid separation according to claim 1, wherein a central part of the core layer has an average porosity of 10 to 80%.

3. The carbon membrane for fluid separation according to claim 1, which is a core/sheath fiber comprising a core part as the core layer and a sheath part as the skin layer.

4. The carbon membrane for fluid separation according to claim 3, which is a fiber having a round cross-section.

5. A hollow-fiber carbon membrane for fluid separation comprising: a core layer which has a co-continuous porous structure; a skin layer which has substantially no co-continuous porous structure and is formed around the core layer; and a hollow part formed inside the core layer, wherein the co-continuous porous structure of the core layer has a structural period of 0.002 to 10 μm.

6. The hollow-fiber carbon membrane for fluid separation according to claim 5, wherein an area ratio A/B of a cross-sectional area A of the hollow part to a cross-sectional area B of the hollow-fiber carbon membrane is 0.001 to 0.7.

7. The hollow-fiber carbon membrane for fluid separation according to claim 5, wherein the core layer has a structural period of 0.05 to 3 μm.

8. The hollow-fiber carbon membrane for fluid separation according to claim 5, wherein pores in the co-continuous porous structure of the core layer have an average diameter of 30 to 1,500 nm.

9. The hollow-fiber carbon membrane for fluid separation according to claim 5, wherein the skin layer has a thickness of 5 μm or less.

10. A fluid separation membrane module produced by fabricating a plurality of membranes into a module, each of the membranes being either the carbon membrane for fluid separation according to claim 3.

11. A fluid separation membrane module produced by fabricating a plurality of membranes into a module, each of the membranes being the carbon membrane for fluid separation according to claim 4.

12. A fluid separation membrane module produced by fabricating a plurality of membranes into a module, each of the membranes being the hollow-fiber carbon membrane for fluid separation according to claim 5.

13. A fluid separation membrane module produced by fabricating a plurality of membranes into a module, each of the membranes being the hollow-fiber carbon membrane for fluid separation according to claim 6.

14. A fluid separation membrane module produced by fabricating a plurality of membranes into a module, each of the membranes being the hollow-fiber carbon membrane for fluid separation according to claim 7.

15. A fluid separation membrane module produced by fabricating a plurality of membranes into a module, each of the membranes being the hollow-fiber carbon membrane for fluid separation according to claim 8.

16. A fluid separation membrane module produced by fabricating a plurality of membranes into a module, each of the membranes being the hollow-fiber carbon membrane for fluid separation according to claim 9.

17. A process for producing a carbon membrane for fluid separation, the process comprising:
- step 1: a step in which 10 to 90% by weight of a carbonizable resin and 90 to 10% by weight of an eliminable resin are brought into a compatibly mixed state to obtain a resin mixture;
- step 2: a step in which the resin mixture obtained in the step 1 is caused to undergo phase separation to form a co-continuous phase separation structure and the separated phases are fixed to obtain a precursor for the carbon membrane for fluid separation; and
- step 3: a step in which the precursor for the carbon membrane for fluid separation obtained in the step 2 is carbonized by pyrolysis.

18. A process for producing a hollow-fiber carbon membrane for fluid separation, the process comprising:
- step 1: a step in which 10 to 90% by weight of a carbonizable resin and 90 to 10% by weight of an eliminable resin are brought into a compatibly mixed state to obtain a resin mixture;
- step 2: a step in which the resin mixture that has been brought into the compatibly mixed state in the step 1 is spun into a hollow fiber and caused to undergo phase separation to form a co continuous phase separation structure to obtain a precursor for the hollow-fiber carbon membrane for fluid separation; and
- step 3: a step in which the precursor for the hollow-fiber carbon membrane for fluid separation obtained in the step 2 is carbonized by pyrolysis.

* * * * *